(12) United States Patent
Woodruff et al.

(10) Patent No.: US 6,196,263 B1
(45) Date of Patent: Mar. 6, 2001

(54) METHODS AND APPARATUS FOR METERING FLOWABLE MATERIAL

(75) Inventors: Keith F. Woodruff, Mountainside; Gottfried Metzler, Brookside, both of NJ (US)

(73) Assignee: American Cyanamid Company, Madison, NJ (US)

( * ) Notice: Subject to any disclaimer, the term of this patent is extended or adjusted under 35 U.S.C. 154(b) by 0 days.

(21) Appl. No.: 09/240,644

(22) Filed: Jan. 29, 1999

Related U.S. Application Data

(60) Provisional application No. 60/084,447, filed on May 6, 1998.

(51) Int. Cl.[7] .................................................. B67D 5/48
(52) U.S. Cl. ................. 137/565.11; 222/164; 222/383.2; 415/121.1; 415/131; 415/140
(58) Field of Search ......................... 137/565.1, 565.17, 137/565.11; 231/122, 215, 218; 222/160, 164, 168, 383.2; 415/121.1, 131, 132, 140, 141

(56) References Cited

U.S. PATENT DOCUMENTS

| 150,082 | 4/1874 | Reif ................................... 222/166 X |
| 173,203 | 2/1876 | Barton . |
| 482,574 | 9/1892 | Fullard . |
| 533,687 | 2/1895 | Walker . |
| 547,466 | 10/1895 | Whisler . |
| 692,434 | 2/1902 | Elliottt . |
| 699,725 | 5/1902 | Toltz et al. ........................ 251/215 X |
| 711,705 | 10/1902 | Keen et al. . |
| 998,282 | 7/1911 | Donholt ................. 251/218 |
| 998,543 | 7/1911 | Meyer . |
| 1,287,756 | 12/1918 | Rork . |
| 1,594,021 | 7/1926 | Smith . |
| 1,595,329 | 8/1926 | Wheatley . |
| 2,173,979 | 9/1939 | Picut ..................................... 251/122 |
| 2,177,265 | 10/1939 | Rath . |
| 2,494,086 | 1/1950 | Curtis ........................... 222/383.2 X |
| 2,499,158 | 2/1950 | Perry ................................ 222/383.2 |
| 3,324,798 | 6/1967 | Freed et al. .......................... 415/131 |
| 3,605,794 | 9/1971 | Hajime Seo . |
| 3,707,334 | * 12/1972 | Ohlsson et al. ............... 415/121.1 X |
| 3,814,293 | 6/1974 | Daves . |
| 3,981,456 | * 9/1976 | Hahn et al. .................. 415/121.1 X |
| 4,201,345 | * 5/1980 | Ziegler ......................... 415/121.1 X |
| 4,338,961 | 7/1982 | Karpenko . |
| 4,588,353 | * 5/1986 | Shibata et al. ................ 415/121.1 X |
| 4,711,376 | 12/1987 | Manfroni . |
| 4,728,256 | * 3/1988 | Araoka .......................... 415/121.1 X |
| 5,011,368 | 4/1991 | Frindel et al. ................... 415/131 X |
| 5,285,989 | 2/1994 | Zilbert et al. . |
| 5,337,775 | 8/1994 | Lane et al. . |

FOREIGN PATENT DOCUMENTS

| 4129210 | 3/1993 | (DE) ........................................ 415/131 |
| 2266749 | 11/1993 | (GB) .................................... 415/137 |

* cited by examiner

Primary Examiner—John Rivell
(74) Attorney, Agent, or Firm—Charles F. Costello

(57) ABSTRACT

A device for metering flowable material is formed from two components which are movable relative to each other. The relative movement of the components varies the width of a gap between the components to control the flow of material through the gap. One of the movable components carries a rotatable element to direct the flow of material towards the gap, and a guide element is provided to direct propelled material into the gap. The rotatable element is preferably a disk, and the gap is a channel located proximate to the periphery of the disk. An element mountable to and rotatable with the disk can be provided to act on and reduce the size of solid or semi-solid material carried by flowing fluid to permit such material to flow through the device.

40 Claims, 4 Drawing Sheets

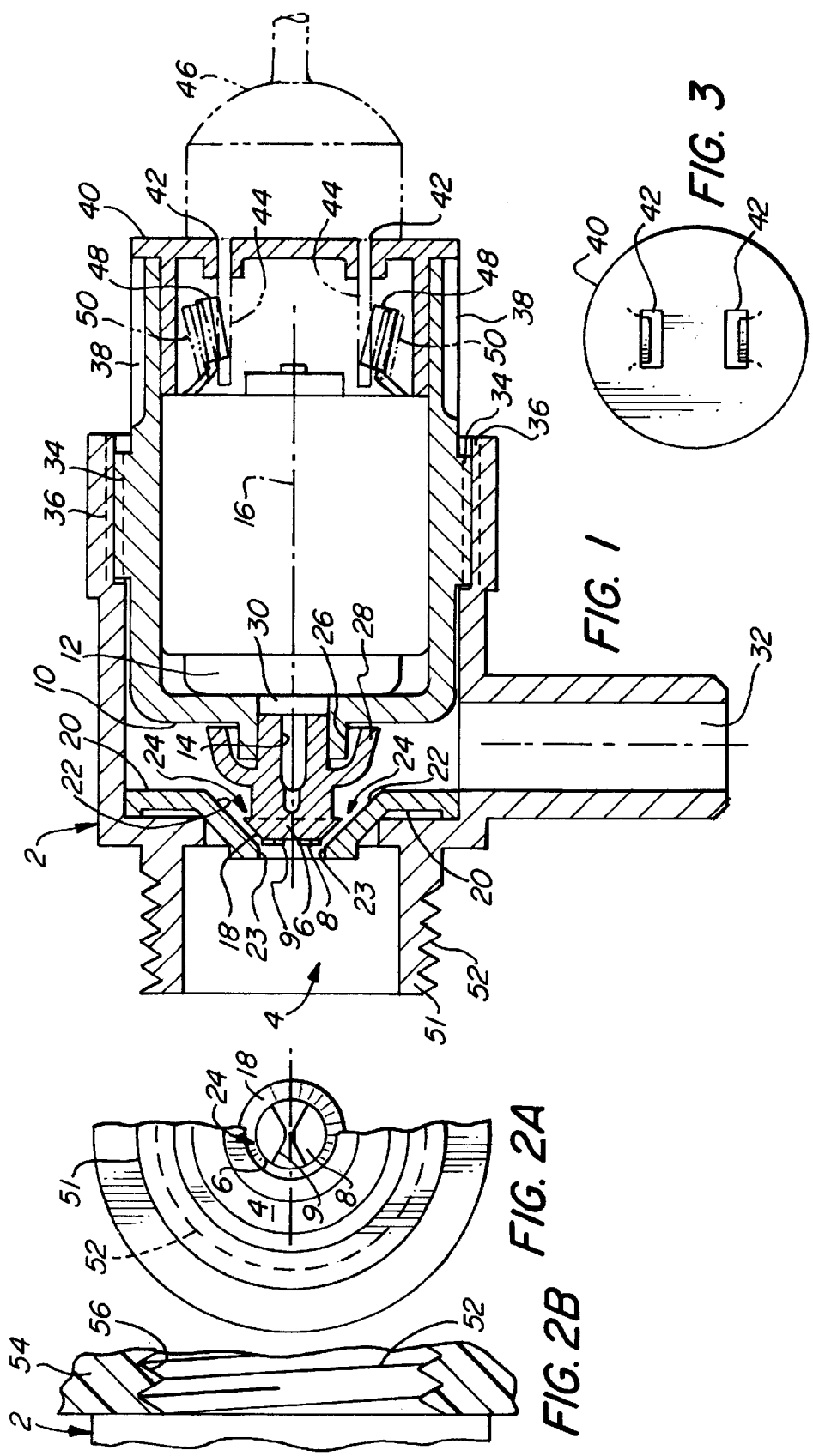

METHODS AND APPARATUS FOR METERING FLOWABLE MATERIAL

This application claims priority from copending provisional application(s) Ser. No. 60/084,447 filed on May 6, 1998.

BACKGROUND OF THE INVENTION

The present invention is directed to methods and devices for metering flowable material. As used herein, flowable material includes fluids (i.e., liquids and gasses), particularly liquids, semi-liquids, and mixtures of liquids and solids; and other material capable of flowing including particulate, granular, and powdered material.

Flow control devices generally known to the art are exemplified by U.S. Pat. Nos. 998,543; 1,287,756; 1,594,021; 2,177,265; 3,605,794; 4,338,961; 4,711,376; and 5,337,775. The needle valve type devices disclosed in the art do not provide accurate control of fluids flowing at a continuous, but relatively low, flow rate. Moreover, precise adjustments to vary the flow of materials of differing viscosities is difficult.

Typical devices for holding containers and discharging the contents thereof are exemplified by the following patents: U.S. Pat. Nos. 173,203; 482,574; 533,687; 547,466; 692,434; 711,705; 1,595,329; 3,814,293; and 5,285,989.

It is the primary object of the present invention to provide improved methods and apparatus for controlling and adjusting the rate at which flowable materials supplied to a metering device are discharged from the device in a predetermined, continuous metered flow. It is a further object of the present invention to provide improved means for controlling the flow rate of material through a metering device and for compensating for variations in viscosity of different materials flowing through the device. It is another object of the invention to provide a portable flow control device requiring only a relatively low energy input for operation, and which is disposable after one use.

Other objects, features and advantages of the device in accordance with the present invention will become apparent from the following discussion.

SUMMARY OF THE INVENTION

A device for controlling the flow of a flowable material includes two components which are selectively movable relative to each other. A gap is defined between the two components, and relative movement of the components varies the width of the gap. Flowable material is supplied to the device through an inlet opening, flows through the gap between the two components, and is discharged from the device through an outlet opening. Adjustment of the width of the gap resulting from the relative movement of the two components controls and selectively varies the flow rate of material through the device.

One of the two relatively movable components, preferably the component facing the inlet opening of the device, includes a rotatable element. The other component includes a stationary surface oriented opposite the rotatable element. Rotation of the rotatable element relative to the opposed stationary surface tends to drive material entering the inlet opening of the device through the gap defined between the two components by rotational forces, and discharged through the outlet opening of the device. Preferably, the gap is a channel defined at the periphery of the rotatable element, and is angularly inclined outwardly in the direction of the flow of material through the device. In this manner, the relative rotation of the two components assists in maintaining a continuous, uniform flow of material through the channel at a preselected rate of flow. The forward surface of the rotatable element facing the inlet opening carries means (such as grooves, ribs or protuberances) for supplementing the rotational forces applied to the material to propel it outwardly towards the inlet end of the channel defined at the periphery of the rotatable element, and also to provide a grinding effect for reducing the mass of any solid or semi-solids within the flowing material to permit the material to pass freely through the channel and not obstruct the flow. The opposed stationary surface includes guide means for guiding the outwardly propelled material into the inlet of the peripheral channel.

In a further aspect of the present invention, a resilient or flexible projection extends from the forward surface of the rotatable element and is rotatable therewith. The projection rotates around a first predetermined axis when pressure from in-flowing fluid surrounding the projection is substantially uniform. When the fluid pressure applied to the projection becomes non-uniform, as for example when solid or semi-solid material is carried by the in-flowing fluid, the projection is displaced from the first axis resulting in bending of the rotating projection to strike and break-up the solid or semi-solid material to enable it to flow through the device. Once this occurs, continuous fluid flow resumes and uniform fluid pressure is again applied to the outer surface of the projection, causing it to return to the first axis of rotation.

Preferably, the first and second components of the device are relatively movable by complementary threaded portions or by telescoping action; the rotatable element is driven by a shaft of a motor mounted in one of the components which also includes means for coupling the motor to a source of electrical power; and the device is designed to be portable and disposable to avoid time consuming clean-up procedures which would otherwise be necessary to remove solidified residue from the components within the device after a metering procedure has been completed.

In a further aspect of the present invention, means are provided for controlling the flow of material into the inlet opening of the metering device. A container for holding flowable material includes a discharge outlet which can be placed in fluid communication with the inlet opening of the metering device so that material flowing by gravity feed from the discharge outlet of the container is supplied to the inlet opening of the metering device. A supporting device for the container includes means for automatically varying the angular inclination of the container relative to the inlet opening of the metering device for controlling the flow rate of material from the container, and assuring that the material is continuously supplied from the container at a uniform, preselected rate of flow. The rate at which the angular inclination of the container is varied relative to the inlet opening of the device is itself adjustable to compensate for differing materials having differing viscosities.

BRIEF DESCRIPTION OF THE DRAWINGS

FIG. 1 illustrates a side elevational view, in section, of a flow control device in accordance with a first embodiment of the present invention;

FIG. 2A is a partial front elevational view of FIG. 1, and FIG. 2B illustrates means for coupling an inlet end of the flow control device illustrated by FIG. 1 to a container for supplying material to the device;

FIG. 3 illustrates a front elevational view of an opposed end of the device illustrated by FIG. 1 including means for coupling the device to a source of electrical energy;

DESCRIPTION OF THE BEST MODES FOR CARRYING OUT THE INVENTION

Figure 4:
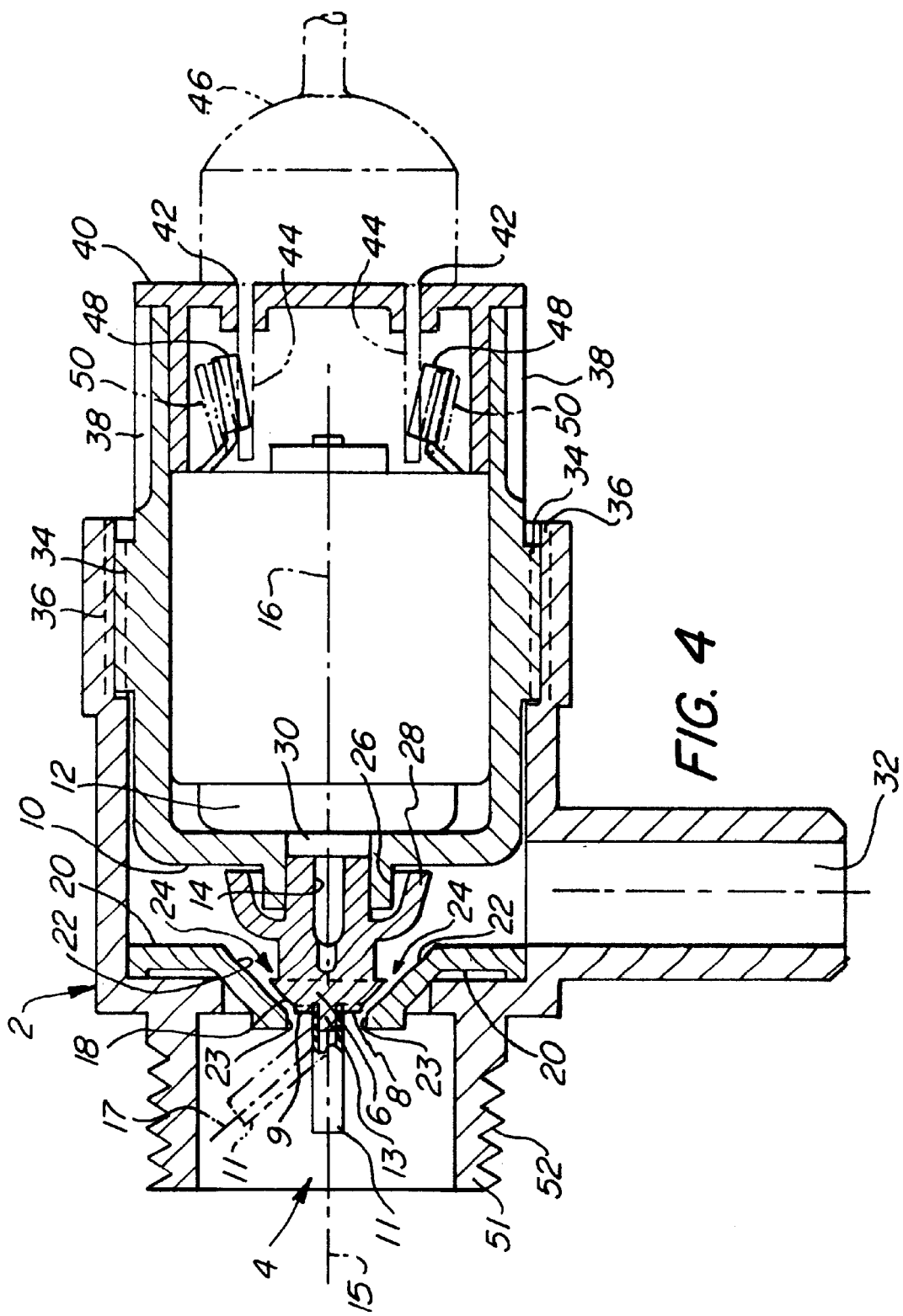
FIG. 4 illustrates a side elevational view, in section, of a second embodiment of a flow control device in accordance with the present invention.

The preferred embodiments of the present invention will now be discussed with reference to FIGS. 1–6 of the drawing.

The flow control device illustrated by FIG. 1 includes a first housing section generally designated by reference numeral 2, which defines an inlet port or opening, generally designated by reference numeral 4, at one end thereof. A rotatable element generally designated by reference numeral 6 has a front surface oriented to face the inlet 4. The front surface of the rotatable element 6 includes raised elements, as for example protuberances or ribs, generally designated by reference numeral 8, extending forwardly from said front surface towards the inlet 4. The raised elements have side surfaces designated by reference numeral 9 which, as will be discussed herein, tend to propel material flowing into the inlet 4 in a radial direction towards the periphery of the rotatable element 6.

Still referring to FIG. 1, a second housing section 10 is coupled to the first housing section 2 by complementary mating threads 34 and 36 defined, respectively, on adjacent portions of the outer surface of the inner housing section 10 and the inner surface of the outer housing section 2. The housing sections 2 and 10 are selectively movable relative to each other in a longitudinal direction along the threaded portions thereof. An electric motor, generally designated by reference numeral 12, is received within the housing section 10 and movable therewith. A motor shaft 14, rotatable along a longitudinal axis 16, extends from an end of the housing 10 facing towards the inlet 4. The rotatable element 6, which in the preferred embodiment of the invention is a disk, is fixedly mounted to the forward end of the motor shaft 14 for rotation therewith.

The periphery of the rotatable disk 6 is beveled to form an inclined surface as illustrated by reference numeral 18. A stationary surface, generally designated by reference numeral 20, is fixed to a portion of the first housing section 2. The stationary element 20 includes an inclined portion designated by reference numeral 22 which is oriented at an angular inclination substantially corresponding to the angular orientation of the beveled edge 18 of the rotatable disk 6. The beveled edge 18 of the rotatable element 6 faces the opposed inclined portion 22 of the stationary surface 20 of the first housing section 2 to define a channel 24 therebetween. The channel 24 is of a substantially uniform, preselected width, and is inclined outwardly relative to the center of the rotatable disk 6 in a direction corresponding to the direction of flow of material from the inlet 4. A forwardly extending collar or flange portion 23 defined at the forwardmost portion of the stationary element 20, extends beyond the front surface of the rotatable element 6 in a direction towards the inlet opening 4, and tends to guide incoming material propelled outwardly by the rotatable element into the inlet end of the peripheral channel 24. Selective movement of the housing section 10 relative to the housing section 2 in a longitudinal direction adjusts the width of the channel 24 defined between the surfaces 18 and 22 for adjusting the flow of material through the channel 24.

Reference numeral 26 generally designates a protective hub disposed around the motor shaft 14, and reference numeral 28 generally designates a protective collar disposed around the hub 26. The hub 26 and the collar 28 are provided to isolate the motor shaft 14 from material flowing through the device which might otherwise interfere with the rotation of the shaft. Among other things, the hub 26 and the collar 28 are arranged relative to the motor shaft 14 to provide a tortuous path, thereby impeding any flow of material proximate to the motor shaft. A gap 30 defined between the motor shaft 14 and the end of the motor housing 10 from which the shaft 14 extends, can be sealed to further inhibit any fluid flow proximate to the rotatable motor shaft.

An outlet port or opening, generally designated by reference numeral 32, is defined by housing section 2. As illustrated by FIG. 1, the outlet port 32 is oriented in a generally perpendicular direction relative to the inlet port 4. The inlet 4 and the outlet 32 are arranged relative to each other such that material entering the inlet 4 must flow through the channel 24 before being discharged from the outlet 32. In this regard, it is noted that housing section 10 is mounted flush within the housing section 2 to provide a fluid tight seal between at least a portion of the outer surface of the housing surface 10 and the inner surface of the housing surface 2 (for example, at the complementary threaded portions 34 and 36 which will be discussed in greater detail below). In this manner, all material entering the inlet 4 can be discharged from the device only through the outlet 32.

Threaded portion 34 of the outer surface of housing section 10 engages corresponding threaded portion 36 defined on an adjacent section of the inner surface of housing section 2. The housing section 10, including the motor 12 contained therein, is rotatable relative to the housing section 2 along the adjacent threaded portions of the respective housing sections. By rotating housing section 10 relative to housing section 2, housing section 10 is moved in a longitudinal direction relative to housing section 2. The direction of rotation of the housing section 10 relative to the housing section 2 determines if the movement of housing section 10 is towards or away from housing section 2. Accordingly, by selectively rotating the housing section 10 relative to the housing section 2 to result in longitudinal relative movement of the housing sections, the width of the channel 24 defined between the respective housing sections is adjustable to control the flow of material through the channel.

One or more indentations designated by reference numeral 38 are defined on the outer surface of the housing section 10 proximate to the rear end of this housing section. The indentations 38 provide means by which the housing section 10 can be firmly gripped by a user to rotate this housing section relative to the housing section 2. In the alternative, the indentations 38 can be replaced by one or more projections extending outwardly from the outer surface of the housing section 10 to provide means for gripping this housing section. Although the device in accordance with the preferred embodiment of the invention discloses rotation of the housing section 10 relative to the housing section 2 for causing relative longitudinal movement of the housing sections, other means for producing relative longitudinal movement of the housing section are within the scope of the invention. For example, housing sections 10 and 2 can be movably mounted together in telescoping relationship.

An end cap for the rear surface of housing 10 is designated by reference numeral 40. A plurality of slots 42 (as best shown by FIG. 3) are defined in the rear surface of the end cap. The slots 42 permit entry of prongs 44 of an electric plug 46 into the rear of the housing section 10. A plurality of electrical contacts 48 are disposed within the rear portion of the housing section 10, and are arranged to engage the prongs 44 of the plug 46 when the prongs are inserted through the slots 42. Resilient means generally designated by reference numeral 50 urge the contacts 48 in a direction towards the prongs 44 to assure firm engagement between the prongs of the plug and the contacts. The electrical contacts 48 are coupled to the motor 12 so that the motor can be operated when the plug is received in the housing section 10.

FIG. 2A illustrates a front elevational view into the inlet port 4 of the device of FIG. 1. The front surface of the rotatable disk 6 is centrally disposed in the inlet port 4, and the protuberances 8 extending forwardly from the front surface of the disk are shown, for illustrative purposes, in an hour glass type configuration. The edges of the protuberances tend to supplement the rotational forces of the disk to propel incoming material striking the front surface of the disk outwardly towards the periphery of the disk as it rotates. FIG. 2A also illustrates the annular channel 24 defined between the periphery of the rotatable disk 6 and the opposed stationary surface 22, as previously discussed with respect to FIG. 1. As also illustrated by FIG. 2A, the inlet port 4 of the device of FIG. 1 is surrounded by a generally annular sidewall 51, defining threads 52 around at least a portion of the outer surface thereof. The threads 52 are adapted to engage complementary teeth 56 defined on a discharge outlet or nozzle of a container generally designated by reference numeral 54 (as shown by FIG. 2B). In this manner, the sidewall 51 can be securely engaged with or locked to the discharge end of a container to supply material from the container (for example, by gravity feed) to the inlet port 4.

In operation of the device disclosed by FIGS. 1–3, the plug 46 is inserted into the housing section 10 to electrically energize the motor 12. Preferably, the source of electrical energy is a portable, rechargeable battery pack coupled to the plug 46. When the motor is energized, the motor shaft 14, and thus the rotatable disk fixedly coupled to the front end of the motor shaft, rotates relative to the stationary surface 20 of the first housing section 2. The width of the channel 24, defined between the inclined peripheral portion of the rotatable disk 6 and the opposed inclined portion 22 of the stationary surface 20, is set at a predetermined substantially uniform spacing by moving the housing section 10 relative to the housing section 2, as discussed above. The width of the channel 24 effects both the flow rate and quantity of material passing through the channel 24, and is selectively adjustable by adjusting the space between the housing sections 10 and 2.

A flowable material, such as a liquid, a semi-liquid, a liquid solid mixture such as a slurry, or a gas, is supplied to the inlet port 4. The material is caused to flow towards the rotatable disk 6 as a result of gravity feed and forces generated by the rotatable disk. As the inflowing material engages the front surface of the rotatable disk, it is propelled outwardly as a result of the applied rotational forces of the disk, and the propelling action of the protuberances carried on the front surface of the rotatable disk. The material is propelled outwardly towards the periphery of the disk and enters an inlet end of the inclined channel 24 defined between the peripheral edge of the rotatable disk and the opposed inclined stationary surface 22. A peripheral rim portion 23 is defined at the forward end of the inclined stationary surface 22, and the rim portion extends in a direction forward of the front surface of the rotatable disk and into the inlet port 4. The inner surface of the stationary peripheral rim portion 23 guides material propelled towards the periphery of the rotatable disk 6 into the inlet end of the inclined angular channel 24. The forwardly extending stationary rim portion 23 thus provides a flange or bumper for guiding outwardly propelled material into the channel 24. Once the material passes through channel 24, it is discharged from the device through outlet port 32, which is the only discharge means provided downstream from the outlet end of the channel 24. As discussed above, the housing section 10 and the housing section 2 are coupled together in fluid tight relationship, thereby preventing material flowing through the channel 24 from being discharged through any space between the two housing sections.

The structure of the meter device as discussed above is arranged to promote uniform flow of material through the device. The channel 24 is defined at the periphery of the rotatable disk so that material entering the inlet of the device is propelled in an outward direction towards an inlet end of the channel. The rotatable disk carries at least one element on the forward surface thereof to supplement the rotational forces of the disk for propelling material outwardly towards the periphery of the disk. The peripheral channel, which is of a substantially uniform width, is inclined in an outwardly oriented direction relative to the center of the rotatable disk in the direction of flow of material from the inlet port. The guide means provided on the stationary element proximate to the inlet end of the channel guides material propelled outwardly by the rotatable disk into the inlet end of the channel. These structural features are provided and arranged to functionally cooperate with each other to assure uniform and continuous flow of material from the inlet port, through the channel, and out the outlet port, at a predetermined flow rate.

Selective adjustment of the relative longitudinal positions of the housing sections 2 and 10 varies the width of the channel 24, thereby providing means for selectively adjusting the quantity of material and the rate of flow of material through the channel for controlling the quantity and flow rate of material discharged through outlet 32. In the preferred embodiments of the invention, the width of the channel is adjustable between a zero gap space in which the channel is closed and no fluid flow is permitted, and a predetermined maximum gap space for providing maximum fluid flow. Since the device is useful for metering materials of different viscosities, the width of the channel is adjustable to compensate for differing viscosities of different flowable materials introduced into the inlet port.

The rotation of the rotatable disk relative to the opposed stationary surface, and the action of the protuberances extending from the front surface of the disk, also provide a grinding effect on the material entering the inlet port. If, for example, material introduced into the inlet port is a mixture of liquids and solids, the grinding effect provided by the action of the rotatable disk, the fowardly extending protuberances which contact the incoming flowing material, and the adjacent stationary surface opposed to the rotatable disk, tend to grind larger particles or solids to a size permitting the material to flow through the channel. This grinding effect tends to prevent any solid particles in the flowable material from becoming wedged in the channel 24 which would obstruct the continuous flow of material and adversely affect the flow rate from the inlet 4, through the channel 24, and out the discharge port 32.

The device in accordance with the present invention is preferably designed as a portable, disposable unit. In this manner, the device can be discarded after it is used to meter a predetermined quantity of material, thereby avoiding time consuming clean-up procedures which would otherwise be necessary to remove residual material from the device, particularly material which has solidifed on components within the device between different metering procedures. The device in accordance with the present invention is also designed to operate with relatively low power consumption, and the source of electrical energy for the motor is preferably a battery.

FIG. 4 illustrates a modified embodiment of the flow control device previously discussed with respect to FIG. 1. The same reference numerals are used in FIGS. 1 and 4 to designate the same elements.

The device illustrated by FIG. 4 includes all elements illustrated by FIG. 1, and additionally includes a projection designated by reference numeral 11 extending from the front surface of the rotatable element 6 into the inlet 4. The projection is mounted to the front surface of the rotatable element by a pin 13 carried by the rotatable element, and the projection and pin are carried by and rotatable with the rotatable element 6. Preferably, the projection is formed from a resilient or flexible material, as for example, a rubber tube. The projection is mounted to the center of the front surface of the rotatable element 6, and rotates along an axis 15 which is oriented in a plane substantially perpendicular to the plane of the front surface of the rotatable element 6.

As a continuous stream of liquid flows into the inlet 4 towards the rotatable element 6 (as discussed with respect to FIG. 1), uniform fluid pressure is applied to the outer surface of the rotating projection 11, causing it to rotate along the central axis 15. However, if non-uniform fluid pressure is applied to the rotating projection, as would occur if fluid flow through the inlet is partially or completely interrupted as for example by solid or semi-solid material carried by the fluid flowing into the inlet 4, the projection will bend and rotate along a displaced position designated by reference numeral 17 as a result of the interaction between the flexible or resilient nature of the material from which the projection is formed and the non-uniform fluid pressure applied thereto. The displaced position 17 is oriented at an angle other than perpendicular relative to the plane of the front surface of the rotatable element 6, resulting in a whipping action by the bent rotating projection 11. The whipping action causes the projection to strike and break-up the solid or semi-solid material in the inlet 4, permitting such material to complete its flow through the device. The in-flowing fluid then returns to its continuous and normal flow pattern, and uniform fluid pressure is applied to the outer surface of the projection 11 causing it to return to its normal position by which it rotates along the central axis 15. The projection remains rotating along the axis 15 until fluid flow through the inlet 4 is again interrupted, at which time the procedure discussed above is repeated. Thus, the flexible tube 11 rotates along its central axis until fluid flow is interrupted, thereafter is automatically displaced from the central axis to remove the source of the interruption, and thereafter automatically returns to its central axis once the source of interruption has been removed. In addition to promoting continuous flow of fluid through the device, this procedure significantly reduces the electric power requirement of the flow control device. Other than as described above, the operation of the embodiment of the invention illustrated by FIG. 4 is identical to the operation of the embodiment of the invention previously discussed with respect to FIG. 1.

Figure 5:
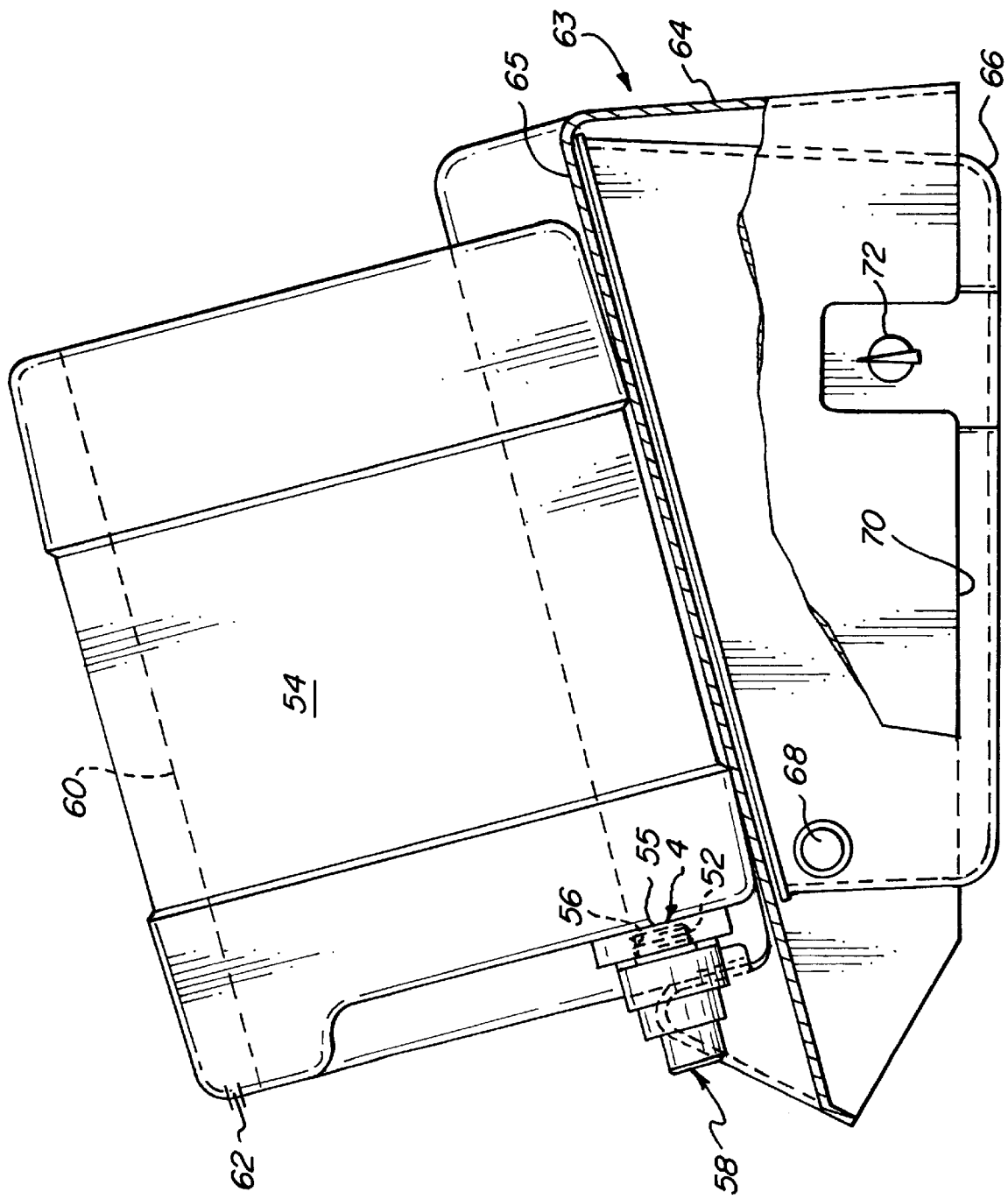
FIG. 5 illustrates a side elevational view, partly in section, of a container holding material be supplied to the inlet of the device illustrated by FIG. 1, the container being substantially filled with material and being carried on a container supporting device.
Figure 6:
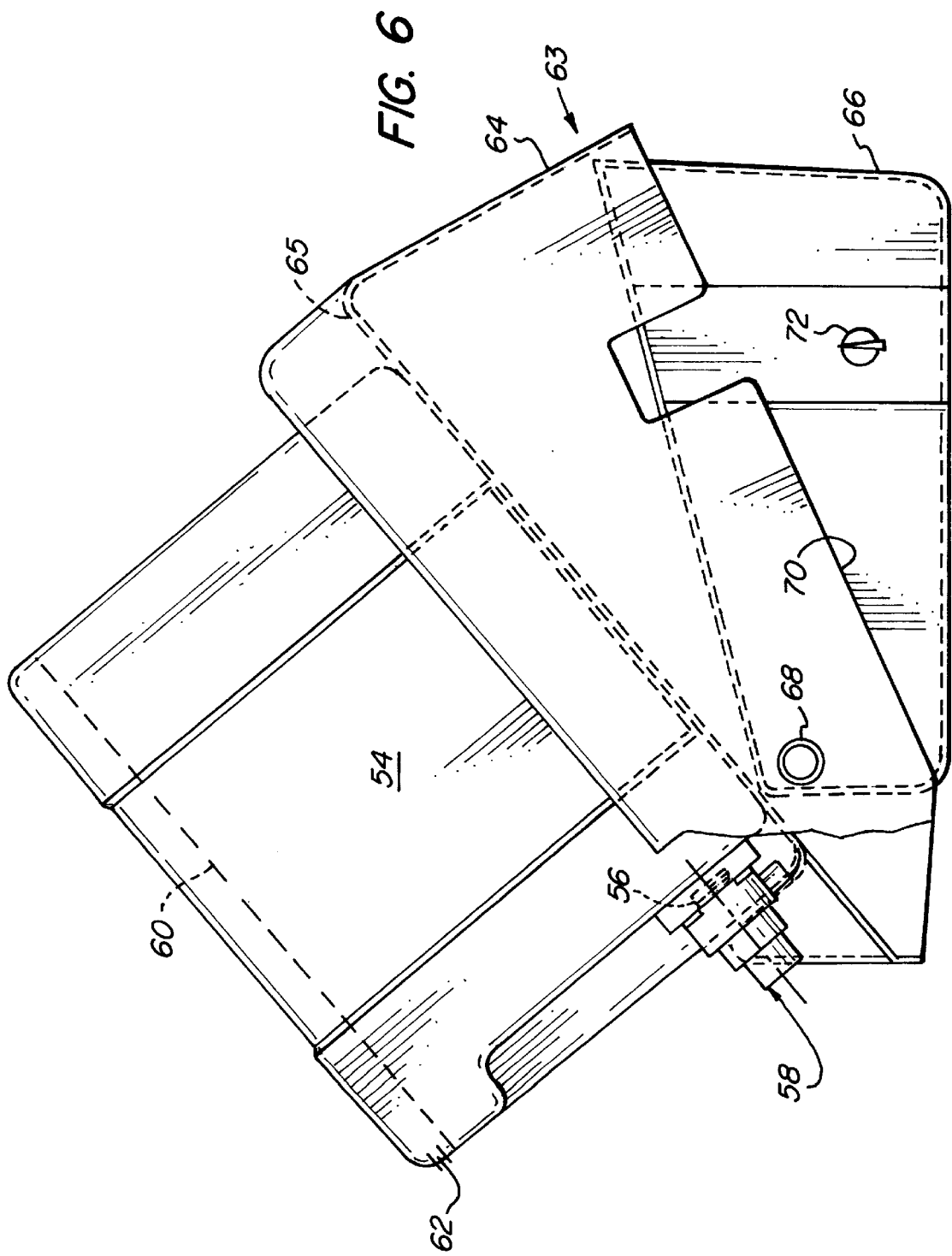
FIG. 6 illustrates the container and container supporting device shown by FIG. 4 when the container is substantially empty.

FIGS. 5–6 illustrate an apparatus which can be used in conjunction with the devices illustrated by FIGS. 1–4 to supply material to the inlet port 4. The apparatus of FIGS. 5–6 is generally represented by reference numeral 63, and includes a lower base portion designated by reference numeral 66, and an upper supporting portion generally designated by reference numeral 64. The upper portion 64 is pivotably mounted to the lower portion of 66 at a pivot axis designated by reference numeral 68. Resilient means, generally designated by reference numeral 70, apply a resilient force on the upper section 64 urging it to pivot away from the lower section 66 (i.e.—in a counterclockwise direction as shown in FIGS. 5–6). A container 54 including material to be supplied to the inlet port 4 of the device of FIGS. 1 and 4 is supported on a top surface 65 of the upper portion 64. Reference numeral 60 generally designates the maximum level of fluid in the container, and reference numeral 62 designates a vent defined in a wall of the container above the maximum fluid level 60 to assure that fluid will flow freely from the container when it is desired to discharge fluid therefrom. A discharge outlet at the lower, front end of the container 54 is designated by reference numeral 55. The device of FIGS. 1 and 4, which is generally designated by the reference numeral 58, is shown coupled to the discharge outlet 55 by complementary threads or teeth 52 and 56, defined respectively, on the mating sections of device 58 and the container 54. When the device 58 is coupled to the container 54, the inlet port 4 is in direct fluid communication with the discharge outlet 55 of the container 54.

FIG. 5 illustrates a substantially fully loaded container 54 supported on the top surface 65 of the upper component 64. The resilient force applied by resilient means 70, urging the upper section 64 to pivot relative to the lower section 66, is less than the opposed force applied to the upper surface 65 by the weight of the container 54 and its contents. Accordingly, when the container is substantially loaded with fluid, the apparatus 63 is in its most retracted position as illustrated by FIG. 5 in which the top surface 65 of upper section 64 is substantially flush against the top surface of the lower section 66. As fluid is discharged from the container 54 through the discharge outlet 55, the composite weight of the container and the contents is decreased, thereby decreasing the applied gravitational forces opposing the resilient means 70. Thus, the upper section 64 will pivot in a counterclockwise direction relative to the lower section 66. FIG. 6 illustrates the relative position of the upper section 64 and the lower section 66 in the maximum extended position of the apparatus 63, which occurs when the container 54 is substantially empty.

It is apparent from a comparison of FIGS. 5 and 6, that as fluid is discharged by gravity feed from a full container into the inlet port 4 of the device illustrated by FIGS. 1 and 4 the angular orientation of the container relative to the inlet of the metering device automatically increases (at a rate determined by the resilient means 70) to assure a continuous rate of flow of material through the container discharge outlet 55 and into the inlet port 4 of the metering device. Reference numeral 72 illustrates a timer which can be used in conjunction with the apparatus 63. For example, the timer can be set to alert the user when a predetermined quantity of fluid has been discharged from the container 54. The total time required to discharge the entire contents of a container 54 can be determined based upon the quantity of material in the container, the viscosity of the material, the size of the discharge outlet 55 and the rate at which the upper section 64 pivots relative to the lower section 66 as a result of the applied resilient force. The user can then set the timer to a predetermined fraction of the time required for complete discharge of the contents of the container, thereby alerting the user when a corresponding fraction of the contents has been discharged from the container. The timer can be coupled to the power supply for the motor of the metering device (FIGS. 1 and 4) to disconnect the motor from its electrical power supply after a preset period of time has elapsed to prevent unnecessary depletion of the electrical power supply.

Preferably, the apparatus 63 is portable, and may be readily carried by a user with the metering device of FIGS. 1 and 4 coupled to it. The top surface 65 of the upper section 64 preferably will include means for securely retaining the container on the upper surface, as for example, sidewalls surrounding at least portions of the container. Although the apparatus 63 is useful in conjunction with supplying fluid to the inlet port of the devices illustrated by FIGS. 1 and 4, it is not essential to the operation of the devices of FIGS. 1 and 4 and other means for supplying fluid to the inlet port 4 can also be appropriately employed.

Other features, advantages, and modifications falling within the scope of the present invention will be apparent to those skilled in the art. Accordingly, the discussion herein of the preferred embodiments is intended to be illustrative only, and not restrictive of the scope of the invention, that scope being defined by the following claims and all equivalents thereto.

What is claimed is:

1. A device for controlling a flowable material, said device comprising:
   first and second components arranged to define a channel between at least a portion of said first component and a portion of said second component,
   means for moving at least one of said first and second components relative to the other for adjusting the size of said channel defined therebetween,
   one of said first and second components being rotatable, and the other of said first and second components being stationary relative to said rotatable component,
   said channel having an inlet opening in fluid communication with an inlet of said device, said rotatable component including a first surface having at least a portion thereof oriented to face towards said inlet of said device,
   said first surface of said rotatable component carrying means for propelling material in a direction towards said inlet opening of said channel, and
   said stationary component including means for guiding material propelled by said rotatable component towards said inlet opening of said channel.

2. The device as claimed in claim 1 wherein said channel defines an inlet opening in fluid communication with an inlet of said device and an outlet opening in fluid communication with an outlet of said device, wherein said inlet and said outlet of said device are in fluid communication with each other through said channel.

3. The device as claimed in claim 2 wherein said channel defined between said first and second components has a predetermined substantially uniform width, said width of said channel being adjustable by said means for relatively moving said first and second components.

4. The device as claimed in claim 3 wherein the flow rate of material between said inlet and said outlet of said device is selectively adjustable by adjusting said width of said channel.

5. The device as claimed in claim 3 wherein said channel is oriented at an angle relative to a common longitudinal axis extending through said first and said second components.

6. The device as claimed in claim 1 wherein said rotatable component is a disk, said channel being defined between the periphery of said disk and at least a portion of said stationary component.

7. The device as claimed in claim 6 further including means coupled to said disk for selectively rotating said disk.

8. The device as claimed in claim 6 wherein said periphery of said disk is beveled.

9. The device as claimed in claim 8 wherein said portion of said stationary element and said beveled periphery are oriented relative to each other substantially along parallel planes.

10. The device as claimed in claim 9 wherein said channel is defined at an angular orientation inclined outwardly relative to the center of said disk in the direction of flow of material.

11. The device as claimed in claim 10 wherein said channel is of substantially uniform width.

12. The device as claimed in claim 1 wherein said means for guiding includes a flange defined on said stationary element proximate to said inlet opening of said channel.

13. The device as claimed in claim 1 wherein said first component is said rotatable component and said second component is said stationary component, said first component being movable by said means for moving in a substantially longitudinal direction relative to said second component for adjusting the size of said channel.

14. The device as claimed in claim 2 further including:
    means for supplying said flowable material to said inlet of said device.

15. The device as claimed in claim 14 wherein said means for supplying said flowable material includes means for supporting a container holding said flowable material.

16. The device as claimed in claim 15 wherein said means for supporting said container includes means for adjusting the angular orientation of a discharge outlet in said container relative to the inlet of said device for causing said flowable material in said container to be supplied to said inlet of said device by gravity feed.

17. The device as claimed in claim 16 wherein said means for supplying includes a base and a supporting element for said container pivotably mounted to said base.

18. The device as claimed in claim 17 further including resilient means acting on said supporting element for pivoting said supporting element relative to the base as the weight of said flowable material in said container decreases as a result of discharge of said flowable material from said container.

19. A device for controlling a flowable material, said device comprising:
    first and second components arranged to define a channel between at least opposed portions of said first and second components,
    first means for moving at least one of said first and, second components relative to the other, for adjusting the distance between said opposed portions thereof and defining said channel therebetween,
    second means for moving one of said first and second components relative to the other independent of said first means, said second means providing rotatable movement to said one of said first and second components,
    wherein said channel defined between said portions of said first and second components has an inlet end and an outlet end; said inlet end of said channel being in fluid communication with an inlet opening of said device, and said outlet end of said channel being in fluid communication with an outlet opening of said device; at least a portion of a surface of said rotatable component being oriented to face in a direction towards said inlet opening of said device, said surface of said rotatable component carrying means for propelling material entering said inlet opening of said device in a direction towards said inlet end of said channel, and said stationary component including means for guiding material propelled by said means for propelling towards said inlet end of said channel.

20. The device as claimed in claim 19 wherein said first means for moving said first and second components relative to each other is adapted to provide relative movement of said first and second components in a substantially longitudinal direction.

21. The device as claimed in claim 19 wherein said channel is defined between at least a portion of the periphery of said rotatable component and at least a portion of said stationary component, said channel being inclined outwardly relative to the center of said rotatable component in a direction from said inlet end to said outlet end of said channel.

22. The device as claimed in claim 21 wherein said channel is of substantially uniform width.

23. The device as claimed in claim 19 wherein said first component is rotatable relative to said second component, and said first component is movable relative to said second component in a substantially longitudinal direction.

24. The device as claimed in claim 19 further including: means for supplying said flowable material to said inlet of said device.

25. A Method for controlling a flowable material introduced into an inlet opening of a device and discharged through an outlet of opening of a device, the steps of said method comprising:

defining a channel between at least portions of first and second components of a device for coupling an inlet opening of said device in fluid communication with an outlet opening of said device;

moving at least one of said first and second components relative to the other for adjusting the width of the channel defined between said first and said second components for controlling a flow rate of said flowable material from said inlet opening to said outlet opening through said channel;

rotating one of said first and second components for propelling material entering the inlet opening in a direction towards an inlet end of the channel defined between the first and second components; and guiding said propelled material into said inlet end of said channel by guide means defined on the other of said first and second components.

26. The method as claimed in claim 25 further including the step of coupling the inlet opening of said device to a source for supplying material into said inlet opening.

27. The method as claimed in claim 25 further including the step of arranging said first and second components such that the width of said channel defined therebetween remains substantially uniform.

28. A device for controlling a flowable material, said device comprising:

first and second components arranged to define a channel between at least a portion of said first component and a portion of said second component, and means for moving at least one of said first and said second components relative to the other for adjusting the size of said channel defined therebetween, wherein said first component is a rotatable element including a projection carried by said rotatable element and rotatable therewith, said projection adapted to be displaced from a first predetermined axis of rotation when non-uniform pressure is applied thereto.

29. The device as claimed in claim 28 wherein said projection is mounted substantially to the center of said rotatable element.

30. The device as claimed in claim 29 wherein said first predetermined axis is oriented substantially perpendicular to the plane of said rotatable element.

31. The device as claimed in claim 28 wherein said projection is formed, at least in part, from a flexible or resilient material.

32. A device for controlling flowable material, said device comprising:

first and second components arranged to define a channel between at least a portion of said first component and a portion of said second component, one of said first and second components comprising a rotatable element, and a projection carried by said rotatable element and rotatable therewith, wherein said projection is adaped to be displaced from a first predetermined axis of rotation when non-uniform pressure is applied thereto.

33. The device as claimed in claim 32 wherein said projection is mounted substantially at the center of said rotatable element.

34. The device as claimed in claim 33 wherein said first predetermined axis is oriented substantially perpendicular to the plane of said rotatable element.

35. The device as claimed in claim 32 wherein said projection is formed, at least in part, from a resilient or flexible material.

36. A device for controlling flowable material, said device comprising:

first and second components arranged to define a channel between at least a portion of said first component and a portion of said second component, one of said first and second components comprising a rotatable element, and a projection carried by said rotatable element and rotatable therewith, wherein said projection is formed, at least in part, from a resilient or flexible material.

37. The device as claimed in claim 36 wherein said projection is mounted substantially at the center of said rotatable element.

38. A method for controlling a flowable material introduced into an inlet opening of a device and discharged through an outlet opening of a device, the steps of said method comprising:

defining a channel between at least portions of first and second components of a device for coupling an inlet opening of said device in fluid communication with an outlet opening of said device;

moving at least one of said first and second components relative to the other for adjusting the width of the channel defined between said first and second components for controlling a flow rate of said flowable material from said inlet opening to said outlet opening through said channel;

providing one of said first and second components with a projection extending therefrom;

rotating said one component to cause said projection to rotate along a first predetermined axis when uniform pressure is applied to said projection; and displacing said projection from said first predetermined axis when non-uniform pressure is applied to said projection.

39. The method as claimed in claim 38 wherein said first predetermined axis is oriented substantially perpendicular to the plane of said one component carrying said projection.

40. The method as claimed in claim 38 further including the step of mounting said projection substantially at the center of said one component.

* * * * *